Figure 1:
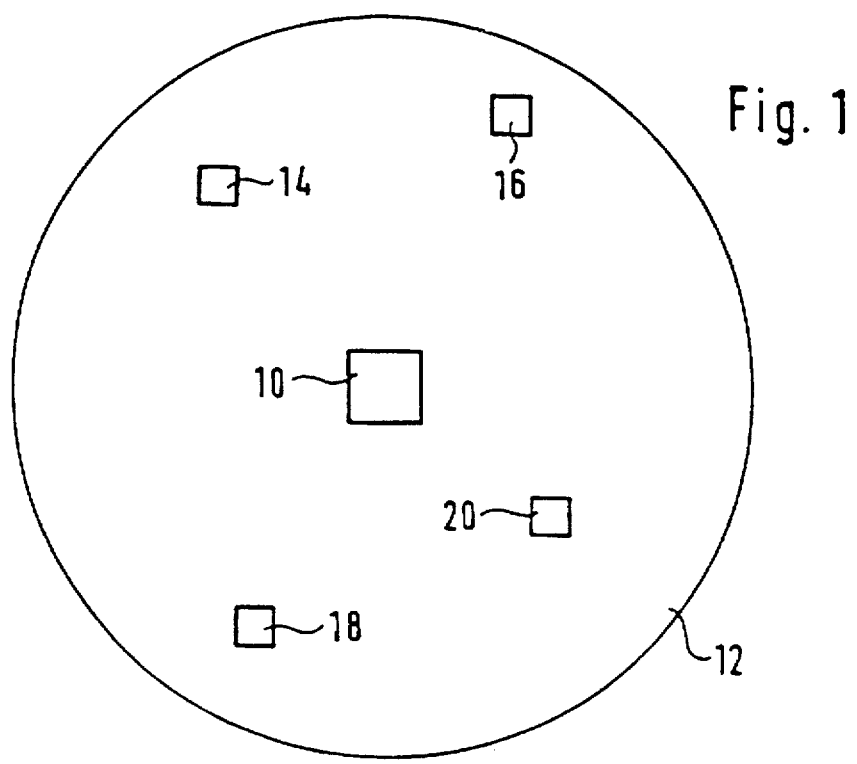

US005751570A

United States Patent [19]
Stobbe et al.

[11] Patent Number: 5,751,570
[45] Date of Patent: May 12, 1998

[54] METHOD OF AUTOMATICALLY IDENTIFYING AN UNKNOWN NUMBER OF TRANSPONDERS WITH A READER AND IDENTIFICATION SYSTEM FOR EXECUTING THE METHOD

[75] Inventors: Anatoli Stobbe, Steinradweg 3, D-30890 Barsinghausen; Holger Merk, Barsinghausen, both of Germany

[73] Assignee: Anatoli Stobbe, Barsinghausen, Germany

[21] Appl. No.: 677,121

[22] Filed: Jul. 9, 1996

[30] Foreign Application Priority Data

Jul. 19, 1995 [DE] Germany .................. 195 26 353.7

[51] Int. Cl.[6] .................................................. H04B 7/00
[52] U.S. Cl. .................... 364/140; 342/44; 342/45; 342/51; 342/42; 340/825.31; 340/825.34; 340/825.49; 340/825.54; 455/41
[58] Field of Search ................... 455/41, 88, 70; 342/42, 44, 45, 51; 340/572, 573, 825.54, 825.34, 825.31, 825.49; 364/140

[56] References Cited

U.S. PATENT DOCUMENTS

| | | | |
|---|---|---|---|
| 5,124,699 | 6/1992 | Tervoert et al. | 340/825.54 |
| 5,430,441 | 7/1995 | Bickley et al. | 340/825.54 |
| 5,450,492 | 9/1995 | Hook et al. | 340/825.54 |
| 5,451,959 | 9/1995 | Schuermann | 342/51 |
| 5,539,394 | 7/1996 | Cato et al. | 340/825.54 |
| 5,543,797 | 8/1996 | Hochstein et al. | 342/42 |
| 5,550,548 | 8/1996 | Schuermann | 342/42 |
| 5,602,538 | 2/1997 | Orthmann et al. | 340/825.54 |

FOREIGN PATENT DOCUMENTS 4003410  4/1992  Germany .

OTHER PUBLICATIONS

"Einführung in die Datenkommunikation", Franz–Joachim Kauffels, 4 Inflage.DATACOM, pp. 49 to 51, (1991).

*Primary Examiner*—Emanuel T. Voeltz
*Assistant Examiner*—Hien Vo
*Attorney, Agent, or Firm*—Burns, Doane, Swecker & Mathis, L.L.P.

[57] ABSTRACT

In a method for automatically identifying an unknown number of transponders, these transponders are put into a dead state by a collision signal transmitted by the reader. Then, each transponder generates its own random dead time and the transponder with the shortest dead time is the first to transmit its data to the reader, while the other transponders are put into an idle state. When the reader has completely received the data of the first transponder, the idle states of the other transponders end and they generate another dead time for themselves. The entire process is then repeated, i.e., the transponder with the shortest dead time transmits its data to the reader, etc. until all transponders have transmitted their data to the reader individually and successively.

20 Claims, 2 Drawing Sheets

METHOD OF AUTOMATICALLY IDENTIFYING AN UNKNOWN NUMBER OF TRANSPONDERS WITH A READER AND IDENTIFICATION SYSTEM FOR EXECUTING THE METHOD

The invention relates to a method of automatically identifying an unknown number of transponders with a reader; furthermore, the invention relates to an identification system for executing the method.

Identification techniques and corresponding methods are increasingly employed in various areas of applications for persons, animals or goods and other objects. For example, such identification methods are used for the purpose of providing certain authorized persons with access to protected rooms or a building. The authorized persons must first be identified to prevent other, unauthorized persons from gaining access.

With the known identification systems, a reader is generally installed near the entrance door to the rooms or building, and this reader transmits an electromagnetic high-frequency field via an antenna. The authorized person wears a small transponder in which special transponder data are stored. When the transponder enters the electromagnetic field emitted by the reader, it automatically begins transmitting its transponder data, which are then received and evaluated by the reader.

When this happens, the transponder is generally supplied with power via the reader's high-frequency field. Furthermore, providing the transponder itself with a small battery as a power source is also possible.

The transponder data received by the reader are normally evaluated by a separate central computer. When the evaluation of the transponder data shows that the data are correct and are considered an authorization for access, the central computer, for example, causes a door to open automatically through which the authorized person can enter.

Such identification methods are also employed for goods and other objects, each of which are provided with a suitable transponder. In this case, each individual object or group of goods is provided with a transponder with transponder data assigned to these goods or group of goods. When the goods, and therefore the transponder, enter the high-frequency field of the reader, the goods can be identified on the basis of the transponder data. Such identification systems are especially important for automated handling of goods and logistics for production processes when certain objects needed at different locations in a production process, etc. must be identified.

The examples mentioned above represent only a small portion of the applications to be found in daily use, which have rapidly become increasingly important in the recent past. A suitable identification system or the reader and transponders required for such a system are known from the German patent DE 40 03 410 C2, etc.

An application of the known identification process which is in principle advantageous is often confronted with a serious disadvantage in praxis. Proper functioning of the reader and transponders is ensured when only one transponder is within the high-frequency field of the reader at one time. When several transponders simultaneously enter the high-frequency field of the reader, the reader is unable to reliably evaluate the transponder data received simultaneously. However, when identification processes are used on a daily basis, a situation in which several transponders are simultaneously within the range of effectiveness of the high-frequency field of the reader, such as when several persons with a transponder are near the entrance door, presents itself more and more often.

Proper functioning of the identification system in such cases can be ensured according to a method described in the U.S. Pat. No. 5,124,699, in which transponders are isolated when an unknown number of transponders are simultaneously within the high-frequency field of the reader so that the transponders can be identified individually and successively. Furthermore, a single transponder is selected first and the other transponders are temporarily prevented from transmitting their transponder data. After the selected transponder has been identified, it is blocked and the remaining transponders are switched back on. This is repeated until all transponders have been identified. In this way, transponders which are simultaneously within the high-frequency field of the reader are identified individually and successively.

In the known method according to U.S. Pat. No. 5,124,699, the individual transponders are isolated in that the reader periodically changes the frequency of the high-frequency field within a given number of certain frequencies. Each transponder is constructed in such a way that it can recognize the various frequencies and the changes in frequency and that the transponder assigned the respective frequency is switched off until only one transponder continues functioning; this transponder can then transmit its transponder data to the reader.

However, realizing this known suggestion requires circuits with considerable constructional details, both in the reader and the transponders being used. As a result, such identification methods are not in common use at present.

The purpose of the invention is to create a method of automatically identifying an unknown number of transponders by a reader in a way which is much easier to execute and realize and which permits reliable isolation of a number of transponders so that the transponder data can be received and evaluated by the reader individually and successively. Furthermore, an identification system should be created according to the invention for the purpose of executing the method.

The purpose is fulfilled in that the invention is provided with characteristics as claimed in Claim 1 with regard to the method, and the purpose with regard to the identification system is fulfilled as claimed in Claim 8.

The invention is based on the knowledge that the transponders in the electromagnetic field of the reader must be influenced in such a way that the transponder data can be recorded by the reader individually and successively rather than simultaneously. In a first step of fulfilling this purpose, the transponders in the electromagnetic field of the reader which have been activated by this field are put into a dead state by a collision signal transmitted by the reader. This dead state prevents the transponders from transmitting transponder data although they are within the high-frequency field of the reader.

Reception of the collision signal causes each transponder to generate a random dead time. During this dead time, the transponders do not transmit transponder data. They do not resume transmission until the end of this time period.

Since the dead times of the individual transponders are generated randomly, one can assume that these dead times deviate from one another and are not identical. This means that the transponder with the shortest dead time resumes transmitting its transponder data after its dead time ends while the other transponders are still in their dead states. Therefore, the reader receives only the transponder data from the said first transponder, at least until the transponder with the second shortest dead time resumes transmission. As soon as the reader has recognized that it has received the transponder data from at least one transponder, it transmits an occupied signal. This occupied signal puts the remaining transponders into an idle state which prevents them from transmitting transponder data after their dead times end.

The steps of the method according to the invention which have been described so far are based on the principle of throwing dice. As each transponder generates its own random dead time, the process can be described in that the involved transponders randomly select which one will transmit first while the others wait.

When the reader has received the complete transponder data from the first transponder with the shortest dead time, the reader transmits an acknowledge signal which puts the previously identified transponder into a passive state in which it ceases transmitting transponder data for the first identification phase. One can therefore say, in consideration of the comparison with the throwing of dice, that the identified transponder is excluded from the game, at least during the first identification phase.

In the next step, the remaining transponders, which are still in an idle state, are reactivated and the previously described individual steps of the method are repeated until all transponders have been identified individually and successively by the reader. At first, all transponders therefore begin transmitting their transponder data, and the reader transmits the collision signal for the purpose of putting the transponders into their dead states. Then, each transponder generates a random dead time for itself, i.e., the transponders again determine among themselves which will be the first to transmit its transponder data to the reader, etc.

The mathematical probability that the dead times generated randomly by the individual transponders do not deviate and that two identical dead times have been generated is slight. Even if this were to happen, the method according to the invention functions reliably. In this case, the reader will again be able to recognize that it is receiving several transponder signals or sets of transponder data rather than a single transponder signal, and the reader will then be able to transmit the collision signal mentioned above so that all the steps of the method according to the invention can be repeated from the beginning until the desired effect is achieved, that a single transponder begins transmitting its transponder data as the first in a sequence due to the various dead times.

According to a practical embodiment of the invention, the dead time of each transponder is defined by a number generated by a random number generator; for example, the identification data (identification number) of the respective transponder can be used in an advantageous way to generate the dead time. The probability that identical dead times are generated is not increased appreciably as a result.

With the present invention, the identified transponder is put into a passive state by the acknowledge signal of the reader, and this acknowledge signal can, according to a further advantageous embodiment of the invention, be used to cause the other transponders in idle states to transmit their transponder data, i.e., these transponders are brought out of their idle states by the acknowledge signal and reactivated.

According to another practical embodiment of the invention, the transponders which are still in idle states can be caused by the acknowledge signal to generate another random dead time, at the end of which they begin transmitting their transponder data. In this embodiment of the invention, it is no longer necessary for the reader to transmit a collision signal after identification of the first transponder.

When all transponders in the high-frequency field of the reader have been identified individually and successively, the reader registers this fact, as it no longer receives transponder data. The reader can then return to its normal mode of operation, i.e., it emits a transmission request so that new transponders which enter the high-frequency field of the reader transmit their transponder data.

According to a practical embodiment of the invention, the reader can also be put into a selectable standby state, virtually taking a break, after all transponders have been identified. This is advantageous when the transponders are equipped with their own power sources in the form of a small battery, which can be spared because the transponders are not evaluating signals transmitted by the reader during this period and therefore do not require power for reacting to the received reader signals.

However, a number of transponders do not require their own battery for operation because power is supplied by the high-frequency field of the reader. In such cases, it is not necessary for the reader to switch to a standby state.

When monitoring of the presence of devices in the range of effectiveness of the electrical field of the reader is desired in addition to identification of the transponders, the reader can when in the standby state generate a continuous electromagnetic field or an electromagnetic field which is interrupted by pauses and which is monitored by all identified transponders. The transponder or transponders which does or do not register the field transmits or transmit its or their transponder data to the reader to signalize its or their presence, and these transponder data are evaluated by the reader. In this case, the transmission range of the transponders must exceed the range of effectiveness of the electromagnetic field of the reader, and the transponders must be equipped with their own power source.

As the transponders are normally ready to receive and transmit only when they are within the range of effectiveness of the electromagnetic field of the reader, their average power consumption is low. The alternative of an electromagnetic field which is interrupted by pauses is preferable with battery-operated mobile readers.

Alternately, it can be provided that, while in the passive state, the transponders repeatedly transmit transponder data to signalize their presence and that these transponder data are evaluated by the reader.

This solution saves a great deal of power with battery-operated mobile readers, as the reader does not need to transmit in the standby state, although more power is consumed by the transponders. On the other hand, they require less transmitter power, as the distances to the reader are shorter.

With the identification system according to the invention for executing the method, the reader is provided with a collision recognition circuit. This circuit makes it possible for the reader to recognize the simultaneous reception of several sets of transponder data, and the reader can then transmit the collision signal. The transponders are equipped with a controller for recognizing and evaluating the collision signal.

In a practical embodiment of the identification system according to the invention, each transponder is equipped with a random number generator for generating a random number and a time-delay circuit for generating a dead time corresponding to the random number.

Figure 2:
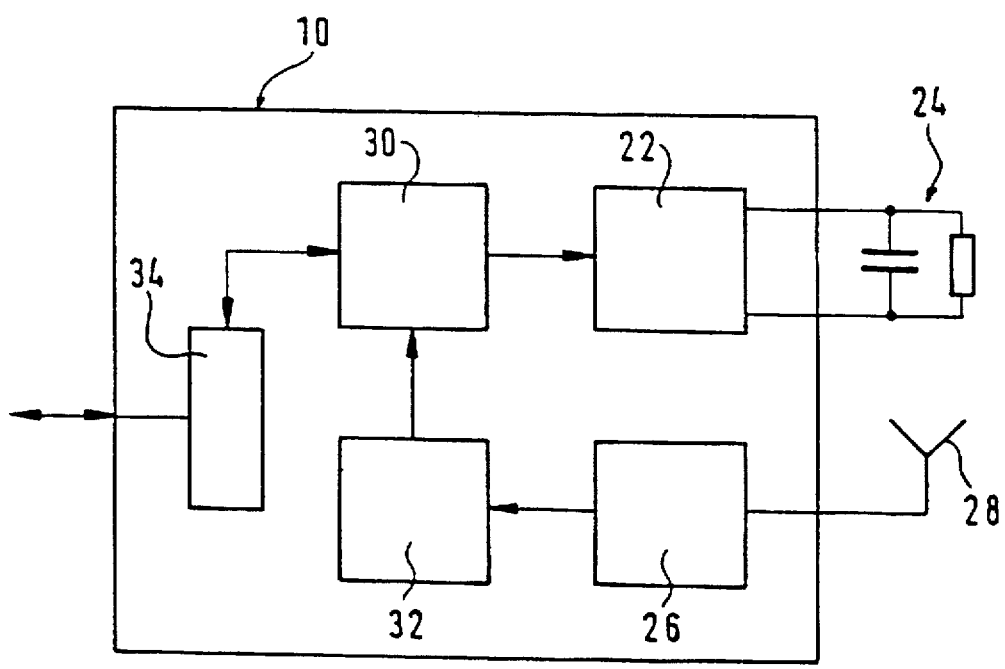
Figure 3:
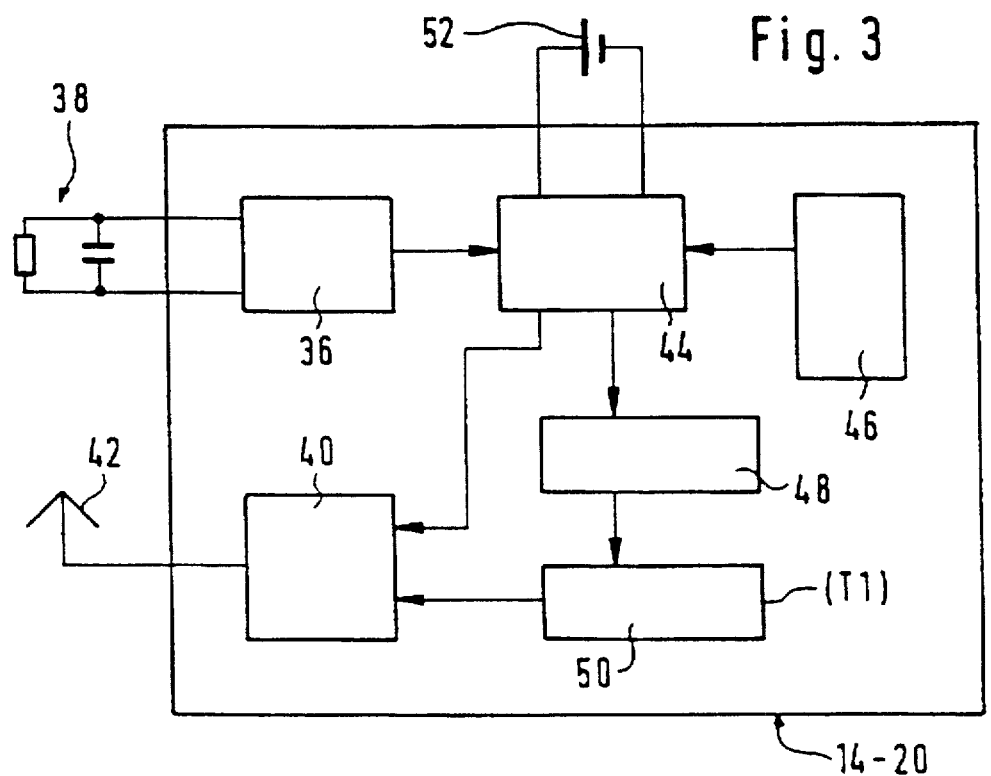

The invention is described in greater detail below on the basis of the drawings. The following is shown:

FIG. 1 a reader and four transponders in the high-frequency field of the reader;

FIG. 2 a schematic circuit diagram of a reader in block form;

FIG. 3 a schematic circuit diagram of a transponder in block form; and

Figure 4:
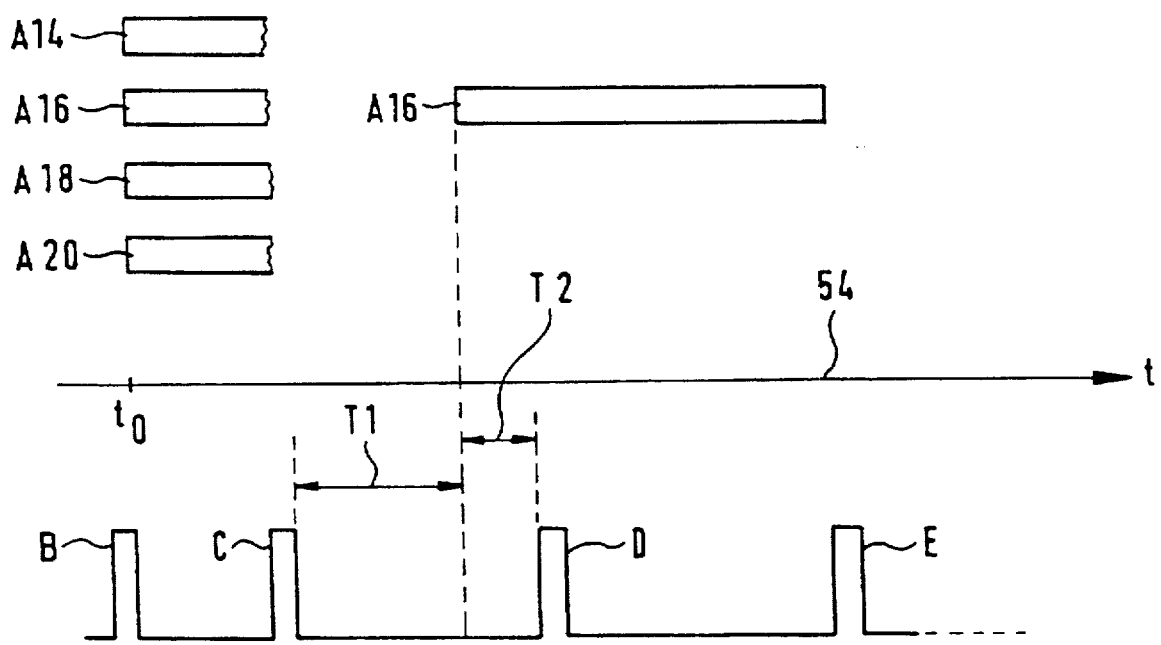

FIG. 4 a schematic graphic representation of transponder data and reader signals.

In FIG. 1, a reader 10 is shown which transmits an electromagnetic high-frequency field 12 symbolized by a circle. The circle is intended to illustrate the range of effectiveness of the high-frequency field 12. The reader 10 emits a transmission request through the high-frequency field 12 in a known way. This causes the transponders 14, 16, 18 and 20 which enter the range of effectiveness of the high-frequency field 12 to transmit their transponder data. The transponder data can comprise identification data of the transponder itself and application-specific characteristic data. These characteristic data can be identified as belonging to certain persons or objects.

FIG. 2 shows a schematic circuit diagram in block form of the construction of a reader 10 comprising a transmitter 22, an oscillating circuit 24 and a receiver 26 with an antenna 28. Furthermore, the reader 10 is equipped with a microprocessor 30 and a collision recognition circuit 32 as an additional important component. The reader 10 can be mobile, i.e., battery-operated, or fixed in position, e.g., near the entrance door of a building which is not shown, and it is connected via an interface 34 to a central computer which evaluates the received transponder data and then initiates certain actions (such as the opening of a door).

The schematic circuit diagram in block form in FIG. 3 shows the construction of a transponder with a receiver 36 with an oscillating circuit 38 as well as a transmitter 40 and an antenna 42. Furthermore, the transponder comprises a controller 44 and a programmable and deletable memory 46 (an EEPROM). This memory 46 represents the actual database for the transponder data. The transponder data comprise identification data of the transponder itself as well as application-specific characteristic data.

Further components of the transponder include a random number generator 48 for generating a random number and a subsequent time-delay circuit 50 for generating a dead time corresponding to the respective random number. The transponder can optionally be equipped with a battery 52 as a power source.

The way in which the method functions as well as that of the reader 10 and the transponders 14–20 are described in more detail on the basis of the schematic graphic representation in FIG. 4. The part of the drawing in FIG. 4 above a time axis 54 relates to transponder data and the part of the drawing below the time axis 54 shows signals from the reader 10.

In accordance with the drawing in FIG. 1, four transponders 14, 16, 18 and 20 are present in the high-frequency field 12 of the reader 10. As a result, the four transponders 14, 16, 18 and 20 begin transmitting their transponder data A14, A16, A18 and A20 at the point in time t0 as a result of the transmission request signal B of the reader 10. Furthermore, all transponders 14, 16, 18 and 20 are transmitting on the same frequency.

The collision recognition circuit 32 of the reader 10 recognizes that it is simultaneously receiving the transponder data A14, A16, A18 and A20 from several transponders 14, 16, 18 and 20, and the collision recognition circuit 32 causes the reader to transmit a collision signal C. This collision signal C is transmitted before the transponders 14, 16, 18 and 20 have completely transmitted their transponder data A14, A16, A18 and A20.

After receiving the collision signal C, the transponders 14, 16, 18 and 20 are caused by their controllers 44 to interrupt transmission of their transponder data A14, A16, A18 and A20 and prevented from transmitting data of any kind. Simultaneously, the random number generator 48 and the time-delay circuit 50 are activated via the controller 44 so that each individual transponder 14, 16, 18 and 20 generates a dead time T for itself.

The transponders 14, 16, 18 and 20 are constructed in such a way that they do not resume transmission of their transponder data A14, A16, A18 and A20 until the end of their dead times. In FIG. 4, the transponder 16 has the shortest dead time T1 and therefore begins transmitting its transponder data A16 to the reader 10 after expiration of this dead time T1. After a certain brief recognition time T2, the reader 10 determines that only the transponder data A16 of a single transponder 16 have been received, and the reader 10 then transmits its occupied signal D.

The occupied signal D puts the transponders 14, 18 and 20 into an idle state, as a result of which they no longer transmit transponder data, even after their respective dead times have expired.

After the reader 10 has recorded these transponder data A16 completely and the respective transponder 16 has been identified, the reader 10 transmits an acknowledge signal E. The remaining transponders 14, 18 and 20 receive this acknowledge signal E and resume the generation of a random dead time T with their random number generator 48 and time-delay circuit 50. The transponder with the shortest dead time then begins transmitting its transponder data, and the process described above is repeated until each transponder 14, 16, 18 and 20 has separately, or all transponders 14, 16, 18 and 20 have individually and successively transmitted their transponder data A14, A16, A18 and A20 and have been recognized and identified by the reader.

Furthermore, the acknowledge signal E not only reactivates the remaining transponders; the previously identified transponder (transponder 16 in the example in FIG. 4) is also put into a passive state in which it no longer responds to the signals of the reader 10, as it has already transmitted its transponder data A16.

It is also possible that the transponder 14, 16, 18 and 20 or its identification number of identification data which has already been correctly identified by the reader 10 is optically displayed so that the person wearing the respective transponder can see that his or her transponder has been identified.

We claim:

1. A method of automatically identifying an unknown number of transponders with a reader, whereby the transponders are activated by an electromagnetic field generated by the reader and transmit their specific transponder data (identification data of the transponder and application-specific characteristic data) to the reader, whereby the transponders can be identified individually and successively by the reader and the transponder data are evaluated, and whereby the method comprises at least the following steps for an initial identification phase:

the transponders which are located within the range of effectiveness of the electromagnetic field and activated are put into a dead state by a collision signal transmitted by the reader in which the transponders cease transmission of transponder data;

each transponder generates a random or pseudo-random dead state for itself after receiving the collision signal;

the transponders resume transmission of their transponder data at the end of their dead states;

the reader transmits an occupied signal after receiving the data from at least one transponder as a result of the deviating dead states;

the other remaining transponders are put into idle states in which they no longer transmit transponder data due to the occupied signal;

after reception of the complete transponder data from the individual transponder, the reader transmits an acknowledge signal;

the transponder which has been identified is put into an idle state by the acknowledge signal in which it ceases transmission of transponder data for the first identification phase; and the other transponders in idle states are reactivated and the steps described above are repeated until all transponders have been identified individually and successively by the reader.

2. A method as claimed in claim 1, characterized in that the dead time is defined by a number generated by a random number generator.

3. A method as claimed in claim 1, characterized in that the identification data of the transponder are used to generate the dead time.

4. A method as claimed in any of claim 1, characterized in that the dead time is generated with the aid of an algorithm which calculates a pseudo-random number.

5. A method as claimed in any of claim 1, characterized in that the knowledge signal causes the transponders which are still in an idle state to transmit their transponder data.

6. A method as claimed in any of claim 1, characterized in that the acknowledge signal causes the transponders which are still in an idle state to generate another random dead time, at the end of which they begin transmitting their transponder data.

7. A method as claimed in any of claim 1, characterized in that all transponders transmit on the same frequency.

8. A method as claimed in any of claim 1, characterized in that the reader switches to a standby state after identifying all transponders.

9. A method as claimed in claim 8, characterized in that the reader in an idle state generates a continuous electromagnetic field or an electromagnetic field interrupted by pauses which is monitored by all the identified transponders and that the transponder or transponders which do not register this field transmits or transmit transponder data to signalize its or their absence and that these transponder data are evaluated by the reader.

10. A method as claimed in any of claim 1, characterized in that the transponders in a passive state repeatedly transmit transponder data to signalize their presence and these transponder data are evaluated by the reader.

11. An identification system with a reader (10) and several transponders (14; 16; 18; 20) for executing the method as claimed in any of claim 1, characterized in that the reader (10) is provided with a collision recognition circuit (32) through which it recognizes the simultaneous reception of several sets of transponder data (A14; A16; A18; A20) and which causes the transmission of a collision signal (C), and that the transponders (14; 16; 18; 20) comprise a controller (44) for recognizing and evaluating the collision signal (C).

12. A method as claimed in claim 2, characterized in that the identification data of the transponder are used to generate the dead time.

13. A method as claimed in claim 2, characterized in that the dead time is generated with the aid of an algorithm which calculates a pseudo-random number.

14. A method as claimed in claim 3, characterized in that the dead time is generated with the aid of an algorithm which calculates a pseudo-random number.

15. A method as claimed in claim 2, characterized in that the acknowledge signal causes the transponders which are still in an idle state to transmit their transponder data.

16. A method as claimed in claim 3, characterized in that the acknowledge signal causes the transponders which are still in an idle state to transmit their transponder data.

17. A method as claimed in claim 2, characterized in that the acknowledge signal causes the transponders which are still in an idle state to generate another random dead time, at the end of which they begin transmitting their transponder data.

18. A method as claimed in claim 2, characterized in that all transponders transmit the same frequency.

19. A method as claimed in claim 2, characterized in that the reader switches to a standby state after identifying all transponders.

20. A method as claimed in claim 2, characterized in that the transponders in a passive state repeatedly transmit transponder data to signalize their presence and these transponder data are evaluated by the reader.

* * * * *